(No Model.) 2 Sheets—Sheet 1.

J. RISSEY & W. J. HORTON.
HORSE DETACHER.

No. 288,365. Patented Nov. 13, 1883.

WITNESSES
F. L. Ourand
C. H. Ourand

INVENTORS
John Rissey,
Wm. J. Horton,
by J. R. Littell,
Attorney.

(No Model.) 2 Sheets—Sheet 2.
J. RISSEY & W. J. HORTON.
HORSE DETACHER.
No. 288,365. Patented Nov. 13, 1883.
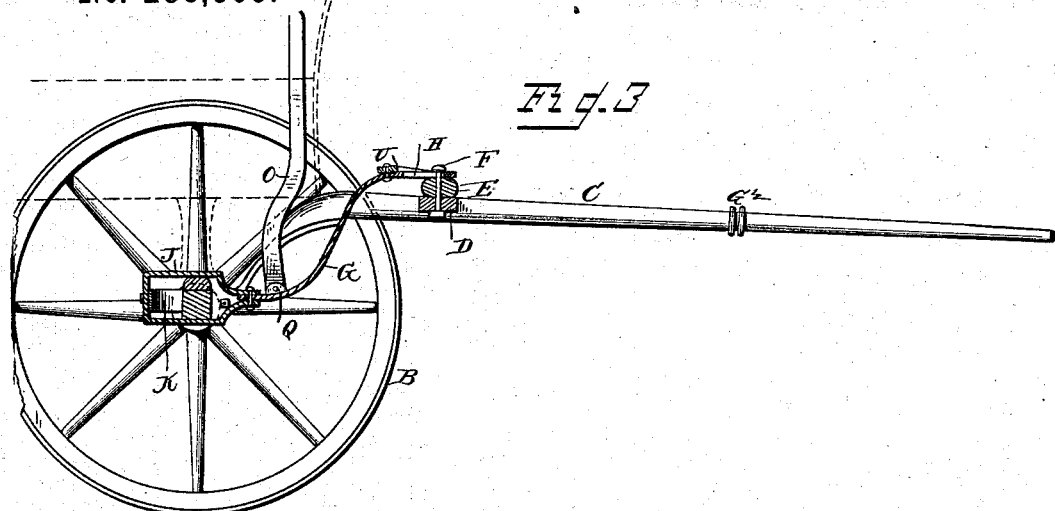
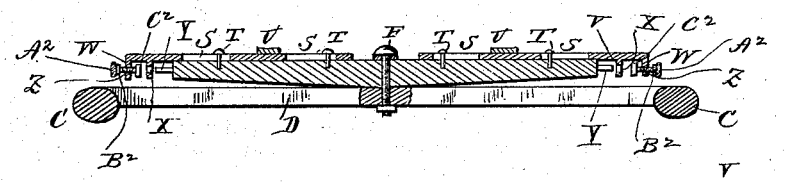
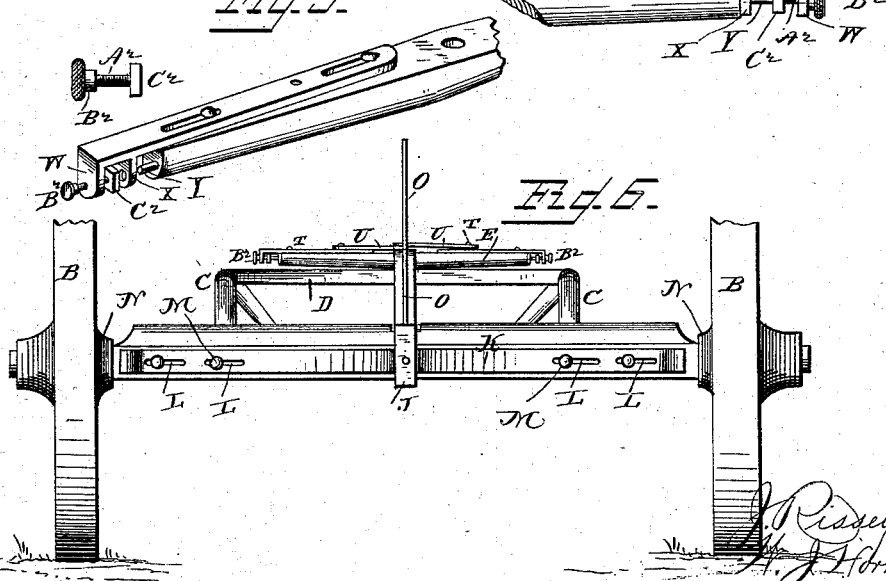
WITNESSES
INVENTORS
Attorney.

UNITED STATES PATENT OFFICE.

JOHN RISSEY AND WILLIAM J. HORTON, OF HALIFAX, NOVA SCOTIA, CANADA.

HORSE-DETACHER.

SPECIFICATION forming part of Letters Patent No. 288,865, dated November 13, 1883.

Application filed August 17, 1883. (No model.)

*To all whom it may concern:*

Be it known that we, JOHN RISSEY and WILLIAM J. HORTON, subjects of the Queen of Great Britain, residing at Halifax, in the Province of Nova Scotia and Dominion of Canada, have invented certain new and useful Improvements in Horse-Detachers; and we do hereby declare the following to be a full, clear, and exact description of the invention, such as will enable others skilled in the art to which it appertains to make and use the same.

This invention relates to devices for detaching horses from vehicles; and its object is to provide a device of this class that can be easily applied to single or double carriages, sleighs, and other vehicles now in use, and which possesses superior advantages in point of simplicity, inexpensiveness, durability, ease of operation, and general efficiency.

Figure 1:
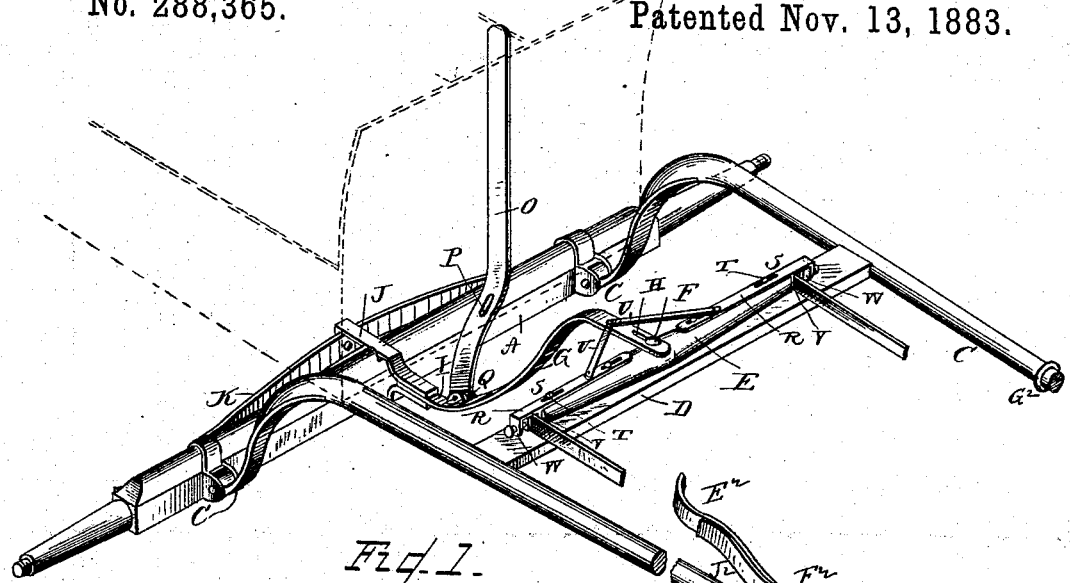
Figure 2:
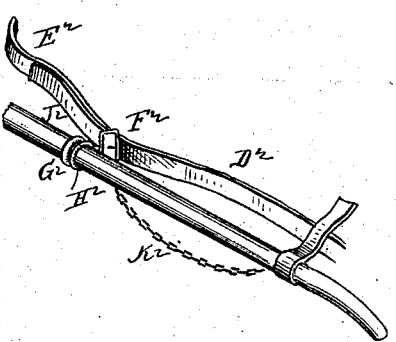
Figure 2:
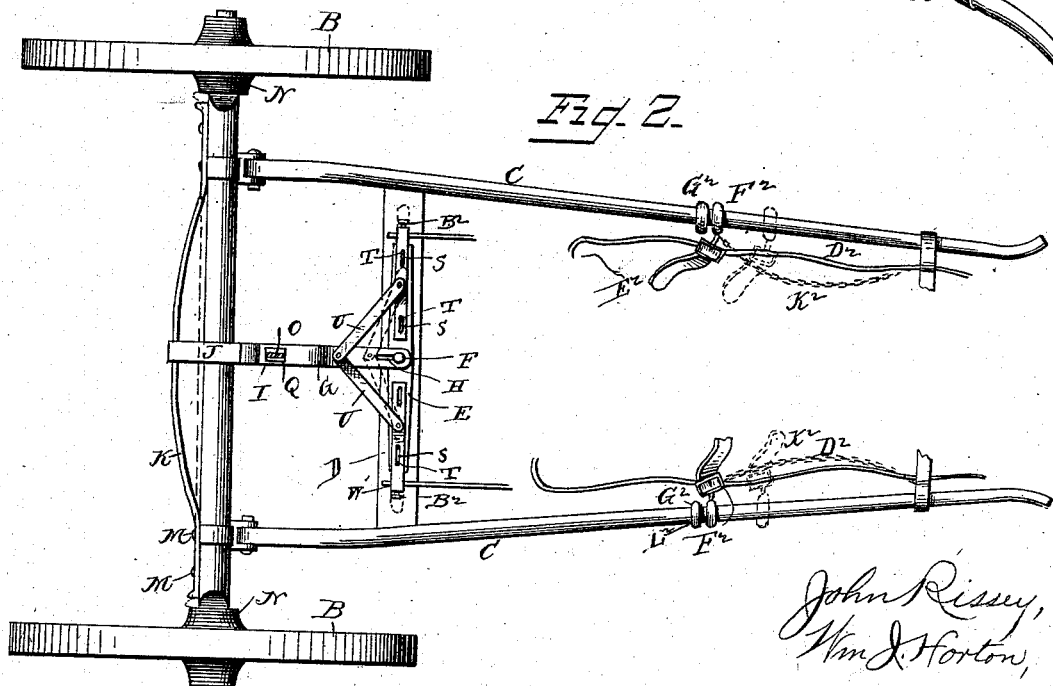

In the drawings, Figure 1 is a perspective view of the front part of a vehicle equipped with our invention. Fig. 2 is a plan view of the same, showing the operation of the detaching mechanism in dotted lines. Fig. 3 is a vertical central longitudinal sectional view thereof. Fig. 4 is a vertical transverse sectional view taken through the whiffletree. Fig. 5 is a detail perspective view of one end of the whiffletree and the trace-holding mechanism. Fig. 6 is a rear view of the front axle of the vehicle.

Referring to the drawings, A designates the front axle of the vehicle, which carries the wheels B B, and to which the thills C C are connected in any suitable manner. The thills carry a transverse bar, D, on which the whiffletree E is swiveled by a pin, F, on which latter works a longitudinally-disposed sliding bar, G, having the slot H, inclosing the said pin, and pivoted at its rear end, I, to a loop or collar, J, that is arranged to inclose the axle A and slide in a plane at right angles to the axle. This collar J is secured to a rearwardly-bowed brake-spring, K, which extends across the rear face of axle A, and is provided with slots L at its ends, that accommodate guide-pins M M, projecting from the axle, whereby the ends of the spring are adapted to bind against the inner faces of the hubs N N of wheels B B when the device is operated.

An operating-lever, O, is fulcrumed, as at P, to the body of the vehicle, preferably just in front of the dash-board, and is pivotally connected to the bar or rod G, as shown at Q.

R R are sliding plates that are arranged one at each end of the whiffletree, and are each provided with end slots, S S, that receive guide-pins T T, projecting from the whiffletree. These plates R R are connected at their inner ends to the rod G by pivoted connecting plates or rods U. At their outer ends these plates are provided with two downwardly-extending flanges, V W, the inner one of which, V, has a perforation, X, to receive a trace-pin, Y, projecting from the end of the whiffletree, while the outer flange, W, has a screw-threaded perforation, Z, in which works the stem of a set-screw, $A^2$, that has a shoulder, $B^2$, to limit its inward adjustment against the end of the pin Y, and is provided with an end plate or head, $C^2$. Normally the flange V will be against the end of the whiffletree, the trace will be connected on pin Y, and the screw $A^2$ will be adjusted with the plate $C^2$ against the pin Y, to retain the trace on the same.

$D^2 D^2$ designate the traces, and $E^2$ the breeching of the harness. The latter is connected to a loop or buckle, $F^2$, on a ring, $G^2$, that is arranged on the thills, and is formed with a convex or rounded inner edge, $H^2$, to faciltate its sliding off the thills when the horse is detached. The back-band $I^2$ of the harness is provided with a loop or ring, $J^2$, by which it is arranged on the thills, and is connected by a chain or cord, $K^2$, with the breeching-ring $G^2$. By this arrangement the breeching can be more readily slipped onto the thills, its movement on the latter being limited by stationary rings or flanges $L^2$.

The operation and advantages of our invention will be readily understood. To detach the horse in case of accident, or when it is desired to unhitch, it is only necessary to draw the lever O toward one's self, when sitting in the seat of the vehicle, when rod G will be carried forward with the collar J, the spring-brake K will be brought against the hubs of the wheels to stop the vehicle, the plates R R will be forced outwardly by rods U U, so that the flanges V V will carry the traces off pins Y Y, and the horse will be instantly disconnected, when the breeching and back-band rings will slide off the thills, so that the horse will be entirely free from the vehicle. By our invention the horse can be instantly disconnected at any time by simply pulling on the lever, and the vehicle will be simultaneously braked, and the mechanism will not in the slightest degree interfere with the free swing of the whiffletree; nor will any movement of the whiffletree interfere with the effective operation of the mechanism.

We claim as our invention—

1. A horse-detacher comprising sliding plates carrying means for retaining and disconnecting the traces, a sliding operating-rod connected with said plates, and brake mechanism secured to the rod and adapted to be operated thereby simultaneously with the plates, substantially as and for the purpose set forth.

2. The combination of the axle of the vehicle carrying the wheels, the whiffletree, plates sliding thereon, and having mechanism at their outer ends for disconnecting the traces, a longitudinally-disposed sliding operating-rod, rods pivotally connecting the latter with the plates, and a rearwardly-bowed brake-spring secured to the operating-rod, and having sliding bearings on the axle, in relation to which latter it is arranged longitudinally, so that its ends will come against the hubs of the wheels, substantially as and for the purpose set forth.

3. The combination of the axle having the wheels, the whiffletree having the end trace-pins, plates sliding on the whiffletree, and having the end flanges, the loop or collar around the axle, an operating-rod pivotally connected to the collar, rods connecting the operating-rod and the plates, an operating-lever connected with said operating-rod, and the rearwardly-bowed brake-spring secured to the collar, and having sliding bearings on the axle, substantially as and for the purpose set forth.

4. The combination of the axle, the wheels thereon, the longitudinally-disposed operating-rod, the lever connected thereto, and the bowed spring extending along the axle, and having sliding bearings thereon, so that its ends will come against the inner faces of the hubs, substantially as and for the purpose set forth.

5. The combination, with the wheels of the vehicle, of a brake-spring connected with operating mechanism and acting against the inner face of the hubs, substantially as set forth.

6. The combination, with the whiffletree having a trace-pin projecting from its end, of a sliding trace-detaching plate having two end flanges, one of which (the inner flange) has a perforation to receive the pin, while the outer flange has a screw-threaded perforation and a set-screw working in the latter to secure the trace in position, substantially as and for the purpose set forth.

7. The combination of the whiffletree having the end trace-pins, the plates sliding thereon, and provided with the end flanges, the longitudinally-disposed operating rod or bar, the pivoted rods connecting the latter to the plates, and the operating-lever connected to said rod, substantially as and for the purpose set forth.

8. In a horse-detacher, the thills having the stationary rings or flanges, the sliding rings carrying the breeching, the rings or loops carrying the back-band, and the chains or cords connecting the said rings, all combined and operating substantially as and for the purpose set forth.

In testimony whereof we affix our signatures in presence of two witnesses.

JOHN RISSEY.
WILLIAM J. HORTON.

Witnesses:
WILLIAM H. FERGUSON,
ROBERT HARRIS.